(12) United States Patent
Johnson et al.

(10) Patent No.: US 10,081,273 B2
(45) Date of Patent: Sep. 25, 2018

(54) BELT-MOUNT SYSTEM FOR JUVENILE VEHICLE SEAT

(71) Applicant: Dorel Juvenile Group, Inc., Foxboro, MA (US)

(72) Inventors: Jason H. Johnson, Brownstown, IN (US); Mei-Hui Lin, Nashville, IN (US); Sean R. Denbo, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/409,602

(22) Filed: Jan. 19, 2017

(65) Prior Publication Data

US 2017/0203672 A1     Jul. 20, 2017

Related U.S. Application Data

(60) Provisional application No. 62/280,926, filed on Jan. 20, 2016.

(51) Int. Cl.
*B60N 2/28* (2006.01)

(52) U.S. Cl.
CPC ......... *B60N 2/2806* (2013.01); *B60N 2/2812* (2013.01); *B60N 2/2866* (2013.01); *B60N 2/2872* (2013.01); *B60N 2/2881* (2013.01); *B60N 2002/2818* (2013.01)

(58) Field of Classification Search
CPC ... B60N 2/2803; B60N 2/2806; B60N 2/2809
See application file for complete search history.

(56) References Cited

U.S. PATENT DOCUMENTS

| | | | |
|---|---|---|---|
| 4,854,639 A * | 8/1989 | Burleigh | B60N 2/2803 297/250.1 |
| 5,567,007 A | 10/1996 | Czernakowski et al. | |
| 5,915,787 A | 6/1999 | Brookman | |
| 5,957,531 A | 9/1999 | Kane et al. | |
| 6,048,028 A | 4/2000 | Bapst | |
| 6,079,780 A * | 6/2000 | Bapst | B60N 2/2806 116/200 |
| 6,336,682 B1 | 1/2002 | Rosko | |
| 6,428,100 B1 | 8/2002 | Kain et al. | |
| 6,554,358 B2 | 4/2003 | Kain | |
| 6,592,183 B2 | 7/2003 | Kain | |
| 6,863,345 B2 | 3/2005 | Kain | |
| 7,246,852 B2 * | 7/2007 | Balensiefer | B60N 2/2851 297/250.1 |
| 7,448,683 B2 | 11/2008 | Rikhof | |
| 7,510,242 B2 * | 3/2009 | Yumoto | B60N 2/2806 297/250.1 |

(Continued)

OTHER PUBLICATIONS

International Search Report and Written Opinion, International Application No. PCT/US2017/014052, dated Apr. 7, 2017, 7 pages.

*Primary Examiner* — Timothy J Brindley
(74) *Attorney, Agent, or Firm* — Barnes & Thornburg LLP (57) ABSTRACT

A juvenile vehicle seat includes a seat bottom and a seat back extending upwardly from the seat bottom. The juvenile vehicle seat is adapted to be used in a harness mode in which a seated child is restrained by a harness coupled to the seat bottom and back. The juvenile vehicle seat is also adapted to be used in a booster mode in which a seated child is restrained by lap and shoulder portions of a vehicle seat belt.

17 Claims, 6 Drawing Sheets

(56) References Cited

U.S. PATENT DOCUMENTS

| | | | |
|---|---|---|---|
| 7,926,874 B2 | 4/2011 | Hendry | |
| 7,988,230 B2 | 8/2011 | Heisey et al. | |
| 9,315,125 B2 * | 4/2016 | Long | B60N 2/809 |
| 2002/0113470 A1 * | 8/2002 | Kain | B60N 2/2806 |
| | | | 297/256.16 |
| 2004/0061366 A1 * | 4/2004 | Meeker | B60N 2/2806 |
| | | | 297/250.1 |
| 2004/0124677 A1 * | 7/2004 | Meeker | B60N 2/2806 |
| | | | 297/255 |
| 2005/0035635 A1 | 2/2005 | Hendrikus | |
| 2005/0168025 A1 * | 8/2005 | Kespohl | B60N 2/2803 |
| | | | 297/256.13 |
| 2006/0091709 A1 * | 5/2006 | Emmert | B60N 2/2806 |
| | | | 297/256.16 |
| 2009/0066131 A1 | 3/2009 | Hendry | |
| 2009/0184549 A1 * | 7/2009 | Kassai | B60N 2/2824 |
| | | | 297/256.1 |
| 2011/0148160 A1 * | 6/2011 | Meeker | B60N 2/2806 |
| | | | 297/250.1 |
| 2011/0272983 A1 * | 11/2011 | Fritz | B60N 2/2806 |
| | | | 297/250.1 |
| 2011/0304180 A1 * | 12/2011 | Dasent | B60N 2/2806 |
| | | | 297/250.1 |
| 2012/0326477 A1 * | 12/2012 | Biaud | B60N 2/2803 |
| | | | 297/256.15 |
| 2013/0300169 A1 * | 11/2013 | Lu | A47D 1/103 |
| | | | 297/250.1 |
| 2014/0132045 A1 | 5/2014 | Brady et al. | |
| 2014/0265255 A1 * | 9/2014 | Wang | B62B 7/06 |
| | | | 280/643 |
| 2017/0190268 A1 * | 7/2017 | Zhao | B60N 2/2806 |
| 2018/0029507 A1 * | 2/2018 | Jane Santamaria | B60N 2/2821 |

* cited by examiner

BELT-MOUNT SYSTEM FOR JUVENILE VEHICLE SEAT

PRIORITY CLAIM

This application claims priority under 35 U.S.C. § 119(e) to U.S. Provisional Application No. 62/280,926, filed Jan. 20, 2016, which is expressly incorporated by reference herein.

BACKGROUND

The present disclosure relates to a juvenile vehicle seat, and particularly to a juvenile seat adapted to be mounted on a passenger seat of a vehicle using the lap and shoulder belts of the vehicle.

Juvenile vehicle seat systems are used to secure young children safely within a vehicle. Often, juvenile vehicle seat systems are mounted to a vehicle passenger seat using the lap belt and shoulder belt associated with the vehicle. The vehicle lap and shoulder belt may be directed around the juvenile vehicle seat in such a fashion that the shoulder and lap belt provide restraint for the juvenile seated on the juvenile vehicle seat.

SUMMARY

According to the present disclosure, a juvenile vehicle seat includes a seat bottom and a seat back extending upwardly from the seat bottom. In illustrative embodiments, the seat bottom and back cooperate to form a monolithic seat shell made of a plastics material and configured to seat a relatively smaller child in a HARNESS mode and a relatively larger child in a BOOSTER mode.

In illustrative embodiments, a first upper belt-receiver slot is formed on the upper left side of the seat back and a second upper belt-receiver slot is formed on the upper right side of the seat back. Each of these upper belt-receiver slots is sized and shaped to receive a shoulder portion of a vehicle seat belt associated with a passenger seat in a vehicle.

In illustrative embodiments, a first lower belt-receiver slot is formed on the lower left side of the seat bottom and a second lower belt-receiver slot is formed on the lower right side of the seat bottom. Each of the lower belt-receiver slots is sized and shaped to receive a lap portion of the vehicle seat belt associated with the passenger seat in the vehicle.

In illustrative embodiments, the seat bottom is also formed to include a first rear belt-receiver channel located on the rear left side of the seat bottom near a junction between the seat bottom and back. A second rear belt-receiver channel is formed on the rear right side of the seat bottom near the junction between the seat bottom and back. In illustrative embodiments, the first and second rear belt-receiver channels are located midway between that junction and the first and second lower belt-receiver slots.

In a HARNESS mode of the juvenile vehicle seat, the vehicle seat belt is used to anchor the juvenile vehicle seat in a stationary position on the passenger seat and a child-restraint harness coupled to the seat bottom and seat back is used to restrain a relatively small child seated on the juvenile vehicle seat. In illustrative embodiments, a shoulder portion of the vehicle seat belt passes through the spaced-apart first and second upper belt-receiver slots to extend laterally across a forwardly facing portion of the seat back. A lap portion of the vehicle seat belt passes through the spaced-apart first and second lower belt-retainer slots to extend laterally over an upwardly facing portion of the seat bottom to hold the juvenile vehicle seat in an anchored position on the passenger seat. The child-restraint harness is used independently of a vehicle seat belt to restrain the child seated on the juvenile vehicle seat. In illustrative embodiments, the child-restraint harness is a five-point child-restraint harness.

In an alternative BOOSTER mode of the juvenile vehicle seat, the vehicle seat belt is also used to restrain a relatively larger child on the juvenile vehicle seat in addition to being used to anchor the juvenile vehicle seat in a stationary position on the passenger seat of the vehicle. In all illustrative embodiments, the lap belt of the vehicle seat belt passes through the first and second rear belt-receiver channels that are formed in the seat bottom to lie near a junction between the seat bottom and back. The lap belt passes across the lower torso of the child to restrain a lower portion of the child. In BOOSTER mode, the lap belt does not pass through the first and second lower belt-receiver slots formed in the seat bottom. In a first BOOSTER mode embodiment, the shoulder portion of the vehicle seat belt extends diagonally in a negatively sloping direction and passes downwardly through the first upper belt-receiver slot, across the upper torso of the child, and through the second rear belt-receiver channel to restrain an upper portion of the child. In a second BOOSTER mode embodiment, the shoulder portion of the vehicle seat belt extends diagonally in a positively sloping direction and passes downwardly through the second upper belt-receiver slot, across the upper torso of the child, and through the first rear belt-receiver channel also to restrain an upper portion of the child.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWING

The detailed description particularly refers to the accompanying figures in which:

FIG. 1 is a perspective view of a juvenile vehicle seat mounted on a passenger seat of a vehicle for use in a HARNESS mode showing that a shoulder portion of a vehicle seat belt is arranged to pass laterally behind a child seated on a seat bottom and through first and second upper belt-receiver slots formed in the seat back and that a lap portion of the vehicle seat belt is arranged to pass laterally under the legs of the child seated on the seat bottom and through first and second lower belt-receiver slots formed in the seat bottom and also showing that the juvenile vehicle seat further includes a separate five-point child-restraint harness coupled to the seat bottom and seat back and used to restrain the child seated on the seat bottom when the juvenile vehicle seat is used to restrain a relatively small child in a HARNESS mode of the juvenile vehicle seat;

FIG. 2 is a perspective view of the juvenile vehicle seat of FIG. 1 used in a BOOSTER mode of the juvenile vehicle seat after removal or disablement of the five-point child-restraint harness from the seat bottom and back and showing that the seat bottom is also formed to include first and second rear belt-receiver channels and that the lap portion of the vehicle seat belt is arranged to pass over the thighs of a child seated on the seat bottom and through the first and second rear belt-receiver channels formed in the seat bottom without passing through the first and second lower belt-receiver slots formed in the seat bottom and showing that the shoulder portion of the vehicle seat belt extends diagonally downwardly through the first upper belt-receiver slot in a negatively sloping direction over the torso of a seated child and through the second belt-receiver channel when the juvenile vehicle seat is used in a BOOSTER mode to seat a relatively larger child;

FIG. 5 is a left-side elevation view of the juvenile vehicle seat of FIG. 3 showing that the free ends of the companion downwardly extending and upwardly extending belt-receiver posts associated with the first upper belt-receiver slot are arranged to lie in close proximity and spaced-apart relation to one another to define therebetween a belt-entry passageway opening into the first upper belt-receiver slot to allow a caregiver to pass the shoulder portion of the vehicle seat belt through that upper belt-entry passageway to reach the first upper belt-receiver slot and showing that a free end of the forwardly extending belt-retainer post associated with the first lower belt-receiver slot is arranged to lie in spaced-apart relation to a companion rearwardly facing wall included in the bottom perimeter wall of seat bottom to define therebetween a belt-entry passageway opening into the first lower belt-receiver slot to allow a caregiver to pass the lap portion of the vehicle seat belt through that lower belt-entry passageway to reach the first lower belt-receiver slot;

FIGS. 8-12 show an illustrative process for anchoring the juvenile vehicle seat of FIGS. 5-7 to a passenger seat of a vehicle using the first and second upper and lower belt-receiver slots to prepare the juvenile vehicle seat for use in HARNESS mode to seat a relatively small child as suggested in FIG. 1;

DETAILED DESCRIPTION

Figures 1, 2:
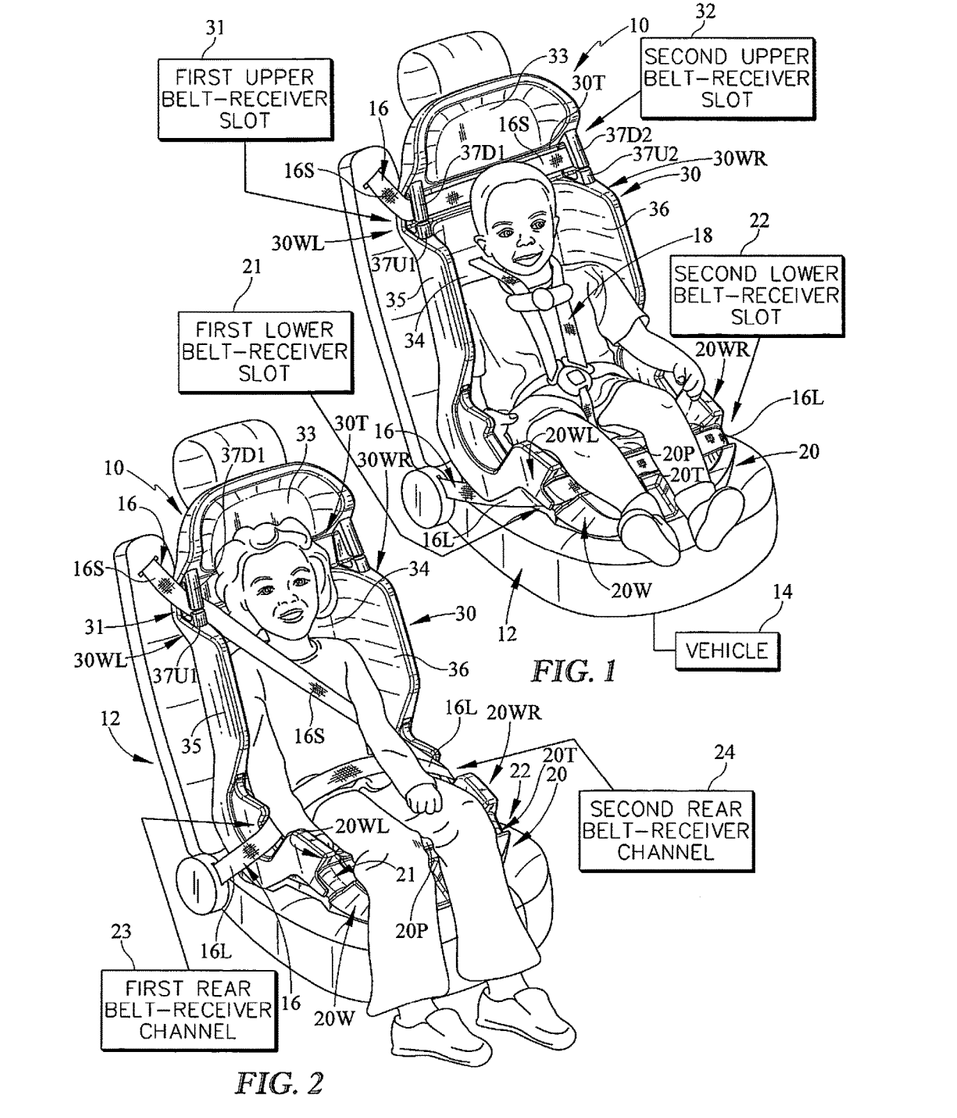

A juvenile vehicle seat 10 in accordance with the present disclosure can be held in place on an underlying passenger seat 12 in a vehicle 14 using a vehicle seat belt 16 included in the vehicle 14 in a HARNESS mode of juvenile vehicle seat 10 as suggested in FIG. 1 or in a BOOSTER mode of juvenile vehicle seat 10 as suggested in FIG. 2. Juvenile vehicle seat 10 includes a seat bottom 20 and a seat back 30 arranged to extend upwardly from a rear edge of the seat bottom as shown, for example in FIG. 3.

Figures 3, 3A, 3B, 4:
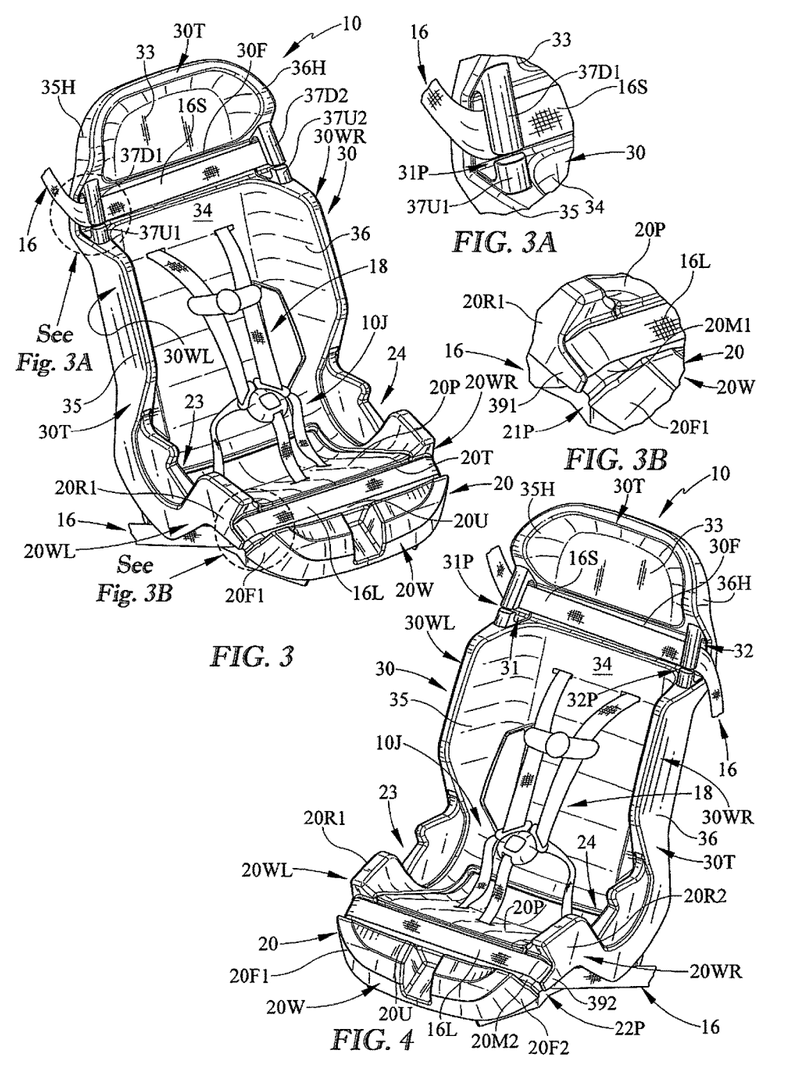
FIG. 3 is a perspective view of the juvenile vehicle seat of FIG. 1 (with the passenger seat of the vehicle omitted) showing the five-point child-restraint harness coupled to the seat bottom and seat back and showing the path of: (1) the shoulder portion of the vehicle seat belt extending laterally across an upper section of a backrest that is included in the seat back and is arranged to lie between the first and second upper belt-receiver slots and through an upper trench formed in the seat back and (2) the lap portion of the vehicle seat belt extending laterally across a seat pad that is included in the seat bottom and is arranged to lie between the first and second lower belt-receiver slots and through a lower trench formed in the seat pad.
FIG. 3A is an enlarged view of a portion of the juvenile vehicle seat taken from a first circled region of FIG. 3 showing that the backrest cooperates with a downwardly extending belt-retainer post and a companion upwardly extending belt-retainer post to form the first upper belt-receiver slot therebetween.
FIG. 3B is an enlarged view of another portion of the juvenile vehicle seat taken from a second circled region of FIG. 3 showing that a portion of a side wall of the seat bottom cooperates with a forwardly extending belt-retainer post to form the first lower belt-receiver slot therebetween.
FIG. 4 is a perspective view of the juvenile vehicle seat of FIG. 3 taken from a different point of view to show the second upper and lower belt-retainer slots and the upper trench formed in the seat back and the lower trench formed in the seat pad.

In the HARNESS mode, a child is restrained on seat 10 as suggested in FIG. 1 using a five-point child-restraint harness 18 that is coupled to seat bottom 20 and seat back 30 while a shoulder portion 16S of vehicle seat belt 16 passes through first and second upper belt-receiver slots 31, 32 and an upper trench formed in seat back 30 and a lap portion 16L of vehicle seat belt 16 passes through first and second lower belt-receiver slots 21, 22 and a lower trench formed in seat bottom 20 without having to be threaded through an aperture (as a thread is passed through an eye of a needle) or other closed belt path as suggested in FIGS. 1, 3, and 4. The lap and shoulder portions 16L, 16S of vehicle seat belt 16 can simply be laid in the seat bottom and back 20, 30 and then locked and tightened without interfering with child-restraint harness 18. This improves belt installation. The shoulder portion 16S is anchored to seat back 30 to provide a tether to minimize excursion of seat back 30 relative to passenger seat 12. An illustrative process for installing the lap and shoulder portions 16L, 16S of vehicle seat belt 16 on juvenile vehicle seat 10 is shown in FIGS. 8-12.

In the BOOSTER mode, the five-point child-restraint harness 18 is not used to restrain a child on juvenile vehicle seat 10. Instead, as suggested in FIG. 2, vehicle seat belt 16 is used to anchor juvenile vehicle seat 10 to passenger seat 12 and also to restrain a child seated on juvenile vehicle seat 10. In BOOSTER mode, shoulder portion 16S of vehicle seat belt 16 passes through first upper belt-receiver slot 31, downwardly in a negatively sloping diagonal direction over the upper torso of the child, and through a second rear belt-receiver channel 24 formed on one side of seat bottom 20 as suggested in FIG. 2 while a lap portion 16L of vehicle seat belt 16 passes through the second rear belt-receiver channel 24, in a lateral direction over the lower torso (e.g. thighs) of the child, and through a first rear-belt-receiver channel 23 formed on an opposite side of seat bottom 20.

In an illustrative embodiment, seat back 30 includes a headrest 33, a backrest 34 arranged to interconnect seat bottom 20 and headrest 33, a forwardly extending first headrest side-wing panel 331 coupled to a left side of headrest 33, a forwardly extending second headrest side-wing panel 332 coupled to a right side of headrest 33, a forwardly extending first backrest side-wing panel 35 coupled to a left side of backrest 34, and a forwardly extending second backrest side-wing panel 36 coupled to a right side of backrest 34 as suggested in FIGS. 3 and 4. Seat back 30 and seat bottom 20 are made of a plastics material and cooperate to form a monolithic seat shell in an illustrative embodiment.

First upper belt-receiver slot 31 is formed on an upper left side of seat back 30 as suggested in FIGS. 1-5. Slot 31 is sized and shaped to receive a shoulder portion 16S of a vehicle seat belt 16 associated with passenger seat 12 of vehicle 14 as suggested in FIGS. 1 and 2. Seat back 30 also includes a downwardly extending first belt-retainer post 37D cantilevered to a left side of headrest 33 and an aligned companion upwardly extending first belt-retainer post 37U cantilevered to a top side of the forwardly extending first side-wing panel 35 as suggested in FIGS. 3 and 3A. Free ends of belt-retainer posts 37D, 37U cooperate to lie in close proximity and spaced-apart relation to one another to define therebetween an upper belt-entry passageway 37P opening into first upper belt-receiver slot 31 as shown, for example, in FIG. 5. In use, a caregiver can pass a section of shoulder portion 16S of vehicle seat belt 16 first through upper belt-entry passageway 37P and then into first upper belt-receiver slot 31 as suggested, for example, in FIG. 11.

Second upper belt-receiver slot 32 is formed on an upper right side of seat back 30 as suggested in FIGS. 1-4. Slot 32 is sized and shaped to receive a shoulder portion 16S of a vehicle seat belt 16 associated with passenger seat 12 of vehicle 14 as suggested in FIG. 1 and FIG. 13. Seat back 30 also includes a downwardly extending second belt-retainer post 38D cantilevered to a right side of headrest 33 and an aligned companion upwardly extending second belt-retainer post 38U cantilevered to a top side of the forwardly extending second side-wing panel 36 as suggested in FIGS. 3 and 4. Free ends of belt-retainer posts 38D, 38U cooperate to lie in close proximity and spaced-apart relation to one another to define therebetween an upper belt-entry passageway 38P opening into second upper belt-receiver slot 32 as suggested in FIGS. 3 and 4. In use, a caregiver can pass a section of shoulder portion 16S of vehicle seat belt 16 first through upper belt-entry passageway 38P and then into second upper belt-receiver slot 32 as suggested in FIGS. 10 and 11.

In an illustrative embodiment, seat bottom 20 includes a seat pad 20P that is arranged to support the buttocks of a child seated in juvenile vehicle seat 10 as suggested in FIGS. 1, 3, and 4. Seat bottom 20 also includes a bottom perimeter wall 20W that is arranged to surround seat pad 20P as suggested in FIGS. 3 and 4. Bottom perimeter wall 20W includes a first rear segment 20R1, a first front segment 20F1, and a first middle segment 20M1 arranged to extend between the first rear and front segments 20R1, 20F1, as suggested in FIGS. 3, 3B, 4 and 5. Bottom perimeter wall 20W also includes a second rear segment 20R2, a second front segment 20F2, and a second middle segment 20M2 arranged to extend between the second rear and front segments 20R2, 20F2 as suggested in FIGS. 4 and 6.

First lower belt-receiver slot 21 is formed on a front left side of seat bottom 20 as suggested in FIGS. 1-3, 5, and 6. Slot 21 is sized and shaped to receive a lap portion 16L of a vehicle seat belt 16 associated with passenger seat 12 of vehicle 14 as suggested in FIGS. 1 and 3. Seat bottom 20 also includes a forwardly extending first belt-retainer post 391 cantilevered to the first rear segment 20R1 of perimeter side wall 20W. A free end of belt-retainer post 391 is arranged to lie in close proximity and spaced-apart relation to the first front segment 20F2 of perimeter side wall 20W to define therebetween a lower belt-entry passageway 391P opening into the lower belt-receiver slot 31. Slot 31 is bounded in illustrative embodiments by the first middle segment 20M1 and portions of the belt-retainer post 391 and the first rear and front segments 20R1, 20F1 as suggested in FIG. 3B.

Second lower belt-receiver slot 22 is formed on a front right side of seat bottom 20 as suggested in FIGS. 1 and 4. Slot 22 is sized and shaped to receive a lap portion 16L of a vehicle seat belt 16 associated with passenger seat 12 of vehicle 14 as suggested in FIGS. 1 and 4. Seat bottom 20 also includes a forwardly extending second belt-retainer post 392 cantilevered to the second rear segment 20R2 of perimeter side wall 20W. A free end of belt-retainer post 392 is arranged to lie in close proximity and spaced-apart relation to the second front segment 20F2 of bottom perimeter wall 20W to define therebetween a lower belt-entry passageway 392P opening into the lower belt-receiver slot 32. Slot 32 is bounded in illustrative embodiments by the second middle segment 20M2 and portions of the belt-retainer post 392 and the second rear and front segments 20R2, 20F2 as suggested in FIGS. 4 and 6.

Seat bottom 20 is also formed to include a first and second rear belt-receiver channels 23, 24 as shown, for example, in FIGS. 3 and 4. First rear belt-receiver channel 23 is located on the rear left side of seat bottom 20 near a junction 10J provided between the seat bottom 20 and seat back 30. Second rear belt-receiver channel 24 is located on the rear right side of seat bottom 20 near the junction 10J provided between seat bottom 20 and seat back 30. In illustrative embodiments, first and second rear belt-receiver channels 23, 24 are located midway between that junction 10J and the first and second lower belt-receiver slots 21, 22.

In the HARNESS mode of juvenile vehicle seat 10, vehicle seat belt 16 is used to anchor juvenile vehicle seat 10 in a stationary position on the passenger seat 12 and a child-restraint harness 18 coupled to the seat bottom 20 and seat back 30 is used to restrain a relatively small child seated on the juvenile vehicle seat 10 as suggested in FIG. 1. Installation of a juvenile vehicle seat 10 in a vehicle 14 using a lap-shoulder belt 16 in accordance with the present disclosure is made easy owing, in part, to formation of lower and upper belt-receiver slots 21, 22, 31, and 32 in seat 10 that are separate from first and second belt-received channels 23, 24 in seat 10.

In illustrative embodiments showing the HARNESS mode of juvenile vehicle seat 10, a shoulder portion 16S of the vehicle seat belt 16 passes through the spaced-apart first and second upper belt-receiver slots 31, 32 to extend laterally across a forwardly facing portion 30F of the seat back 30 and lie in an upper trench as suggested in FIGS. 3 and 4. A lap portion 16L of the vehicle seatbelt 16 passes through the spaced-apart first and second lower belt-retainer slots 21, 22 to extend laterally over an upwardly facing portion 20U of the seat bottom 20 and lie in a lower trench to hold the juvenile vehicle seat 10 in an anchored position on the passenger seat 12 as suggested in FIGS. 3 and 4. The child-restraint harness 18 is used independently of a vehicle seat belt 16 to restrain the child seated on the juvenile vehicle seat 10 as shown, for example, in FIG. 2. In illustrative embodiments, the child-restraint harness 18 is a five-point child-restraint harness as shown in FIGS. 3 and 4.

The lower belt-receiver slots 21, 22 near the bottom front of seat 10 cooperate to create a belt path of the lap portion 16L of vehicle seat belt 16. The upper belt-receiver slots 31, 32 near the top of seat back 30 cooperate to create a belt path for the shoulder portion 16S of vehicle seat belt 16. These belt paths are left open in accordance with the present disclosure such that the belt 16 can be laid directly in the belt path so there is no need for threading the belt through an aperture or other closed belt path. The lap portion 16L and shoulder portion 16S of vehicle seat belt 16 do not need to be threaded through a closed belt path when used to anchor juvenile vehicle seat 10 to a passenger seat 12 in a vehicle. The belt portions 16L, 16S can simply be laid in seat 10 and then locked and tightened and do not interfere with internal child-restraint harness 18. This eases installation of shoulder portion 16S of vehicle seat belt 16. In such a location as suggested in FIGS. 1-4 the shoulder portion 16S cooperates with seat 10 to tether the juvenile vehicle seat 16 to the passenger seat 12 to minimize excursion of seat 16 relative to vehicle 14 during exposure of vehicle 14 to an external impact.

In the alternative BOOSTER mode of juvenile vehicle seat 10, the vehicle seat belt 16 is also used as shown in FIG. 2 to restrain a relatively larger child on the juvenile vehicle seat 10 in addition to being used to anchor the juvenile vehicle seat 10 in a stationary position on the passenger seat 12 of the vehicle 14. In all illustrative BOOSTER mode embodiments, lap belt 16L of vehicle seat belt 16 passes through the first and second rear belt-receiver channels 23, 24 that are formed in the seat bottom 20 to lie near a junction 10J provided between the seat bottom 20 and seat back 30. In BOOSTER mode, the lap belt 16L does not pass through the first and second lower belt-receiver slots 21, 22 and the lower trench formed in the seat bottom 20. In a first BOOSTER mode embodiment, the shoulder portion 16S of the vehicle seat belt 16 extends diagonally in a negatively sloping direction and passes downwardly through the first upper belt-receiver slot 31, across the upper torso of the child, and through the second rear belt-receiver channel 24 as shown, for example, in FIG. 2. In a second BOOSTER mode embodiment, the shoulder portion 16S of the vehicle seat belt 16 extends diagonally in a positively sloping direction and passes downwardly through the second upper belt-receiver slot 32, across the upper torso of the child, and through the first rear belt-receiver channel 24 as suggested in FIG. 13.

Figure 8:
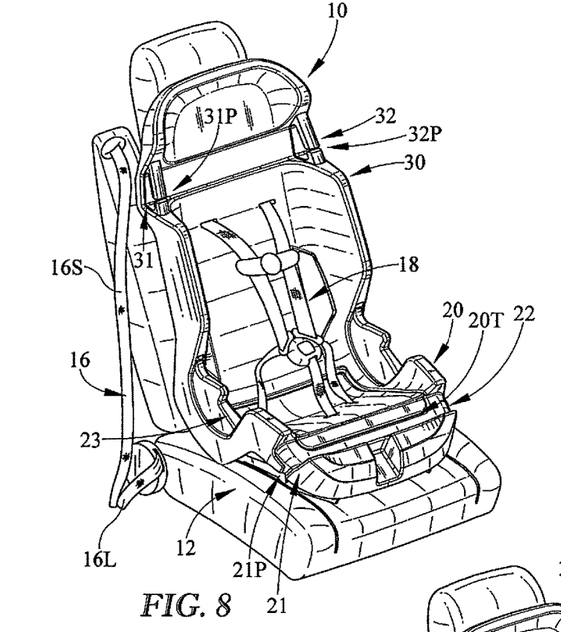
FIG. 8 shows placement of the juvenile vehicle seat in an untethered position on a passenger seat.

An illustrative easy installation process for anchoring the juvenile vehicle seat 10 to a passenger seat 12 of a vehicle 14 using the first and second upper and lower belt-receiver slots 31, 32 is shown in FIGS. 8-12 to prepare the juvenile vehicle seat 10 for use in HARNESS mode to seat a relatively small child. The process of mating the lap and shoulder portions 16L, 16S of vehicle seat belt with seat bottom 20 and seat back 30 is simplified as a result of the formation of seat bottom 20 to include belt-receiver slots 21, 22 and lower trench 20T and the formation of seat back 30 to include belt-receiver slots 31, 32 in accordance with the present disclosure. Placement of the juvenile vehicle seat 10 in an untethered position on a passenger seat 12 is shown in FIG. 8.

Figure 9:
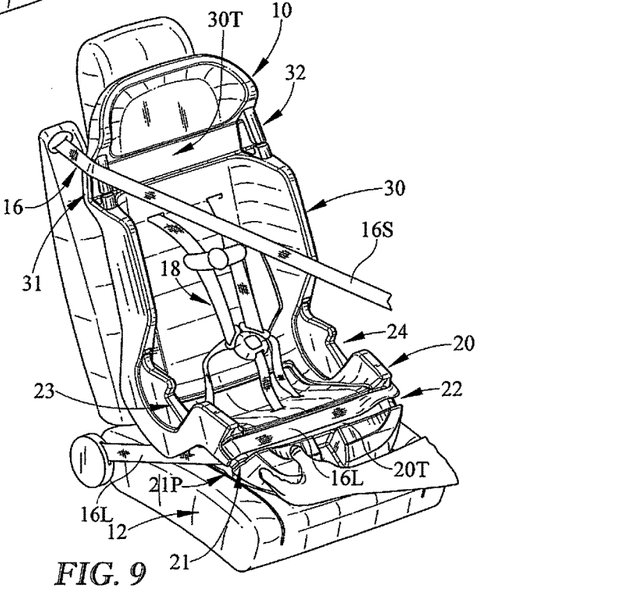
FIG. 9 shows that the vehicle seat belt has been pulled across the juvenile vehicle seat by a caregiver and that a left-side section of the lap portion of the vehicle seat belt has been inserted into the first lower belt-receiver slot while a right-side section of the lap belt is being passed into the second lower belt-receiver slot through its belt-entry passageway and showing that the shoulder portion of the vehicle seat belt has been stretched to extend downwardly in a negatively sloping diagonal direction and to overlie the seat bottom and back.

Vehicle seat belt 16 is pulled initially across the juvenile vehicle seat 10 by a caregiver as suggested in FIG. 9 and a left-side section of the lap belt 16L is inserted into the first lower belt-receiver slot 21 through its belt-entry passageway 21P while a right-side section of the lap belt 16L is passed into the second lower belt-receiver slot 22 through its belt-entry passageway 22P. The shoulder strap 16S is stretched to extend diagonally downwardly in a negatively sloping diagonal direction and to overlie the seat bottom 20 and seat back 30. The lap portion 16L of the vehicle seat belt 16 has been installed on the seat bottom 20 as shown, for example, in FIG. 10.

Figures 10, 11:
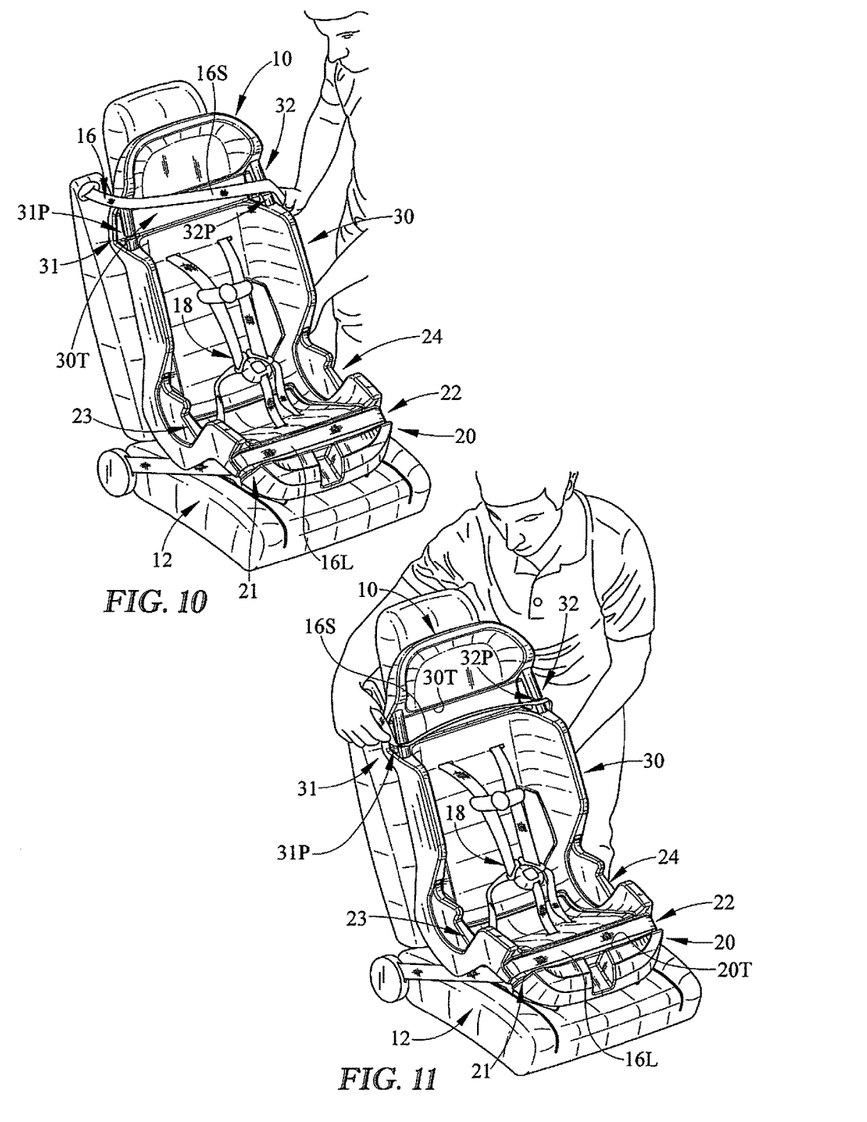
FIG. 10 shows that the lap portion of the vehicle seat belt has been installed on the seat bottom and suggesting that a first step for installing the shoulder portion of the vehicle seat belt is to pass a right-side section of the shoulder portion through the second upper belt-entry passageway into the second upper belt-retainer slot.
FIG. 11 suggests that a second step for installing the shoulder portion of the vehicle seat belt is to pass a left-side section of the shoulder portion through the first upper belt-entry passageway into the first upper belt-retainer slot.

As suggested in FIG. 10, a first step for installing the shoulder portion 16S of the vehicle seat belt 16 is to pass a right-side section of the shoulder portion 16S through the second upper belt-entry passageway 32P into the second upper belt-retainer slot 32. As suggested in FIG. 11, a second step for installing the shoulder portion 16S of the vehicle seat belt 16 is to pass a left-side section of the shoulder portion 16S through the first upper belt-entry passageway 31P into the first upper belt-retainer slot 31. Juvenile vehicle seat 10 in an installed position on the passenger seat 12 of the vehicle 14 before a child is seated thereon and restrained in a seated position using the five-point child-restraint harness 18 coupled to the seat bottom 20 and seat back 30.

Figures 12, 13:
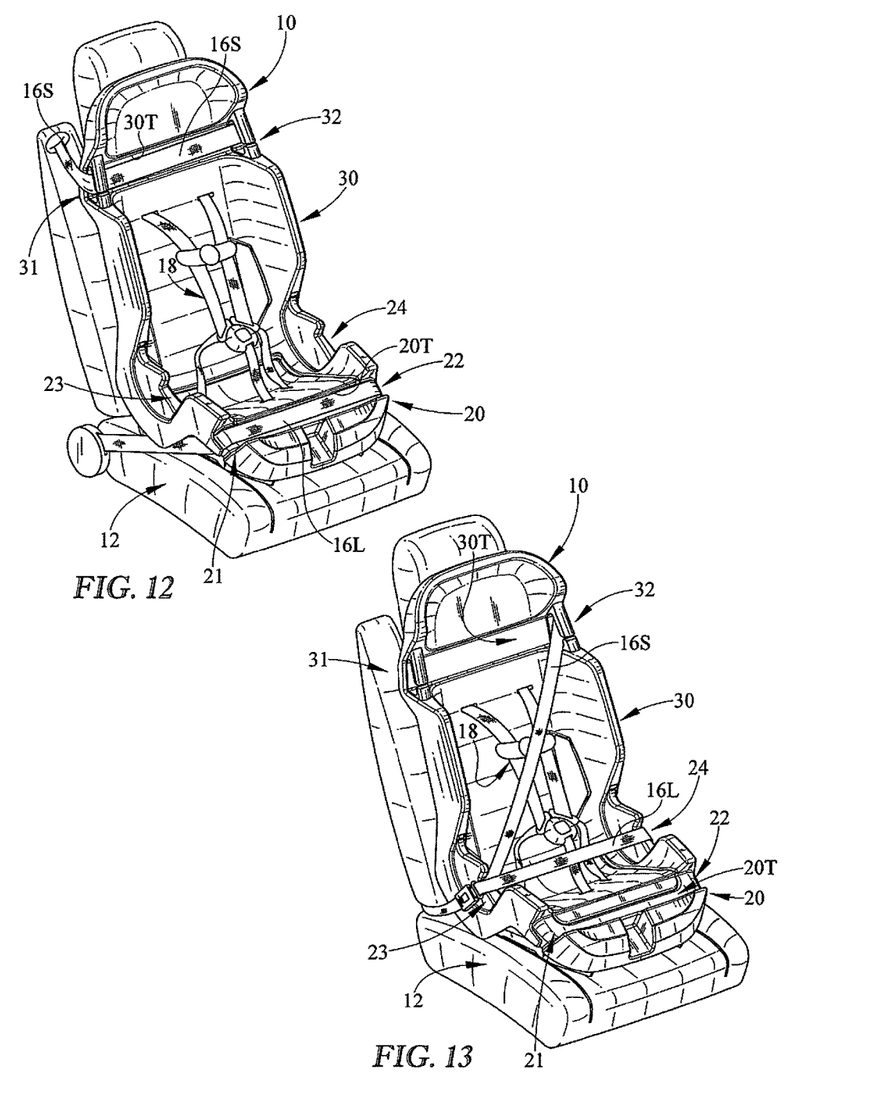
FIG. 12 shows the juvenile vehicle seat in an installed position on the passenger seat of the vehicle before a juvenile is seated thereon and restrained in a seated position using the five-point child-restraint harness coupled to the seat bottom and seat back.
FIG. 13 is a view of the juvenile vehicle seat of FIGS. 1-12 anchored in place on a passenger seat of a vehicle for use in BOOSTER mode showing that the lap portion of the vehicle seat belt passes through the first and second rear belt-receiver channels and that the shoulder portion of the vehicle seat belt passes downwardly in a positively sloping diagonal direction through second upper belt-receiver slot formed in the seat back and through the first rear belt-receiver channel formed in the seat bottom.

A perspective view of the juvenile vehicle seat 10 anchored in place on a passenger seat 12 of a vehicle 14 for use in BOOSTER mode is shown in FIG. 13. Lap portion 16L of the vehicle seat belt 16 passes through the first and second rear belt-receiver channels 23, 24. Shoulder portion 16S of the vehicle seat belt 16 passes diagonally downwardly in a positively sloping diagonal direction through second upper belt-receiver slot 32 formed in the seat back 30 and through the first rear belt-receiver channel 23 formed in the seat bottom 20.

Seat bottom of juvenile vehicle seat 10 is adapted to set on a passenger seat 12 of a vehicle 14 as shown in FIGS. 1 and 2. Seat bottom 20 includes a seat pad 20P adapted to support the buttocks of a child seated on seat bottom 20 and a bottom perimeter wall 20W arranged to extend along a perimeter portion of seat pad 20P. Seat pad 20P includes a left side alongside first lower belt receiver slot 21 and first rear belt-receiver channel 23, a right side opposite to the left side, and a rear side arranged to lie near seat back 30 and to extend from the left side to the right side as shown in FIGS. 3 and 4. Bottom perimeter wall 20W includes a lower left-side wall strip 20WL that is formed to include a first lower belt-receiver slot 21 located on the left side of seat pad 20P and a lower right-side wall strip 20WR that is formed to include a second lower belt-receiver slot 22 located on right side of the seat pad 20P as shown in FIGS. 3 and 4.

Seat back 30 is arranged to extend upwardly from the rear side of seat pad 20P to establish a junction 10J between a rear portion of seat bottom 20 and a lower portion of seat back 30 as shown in FIGS. 3 and 4. Seat back 30 includes a backrest 34 adapted to support an upper torso of a child seated on seat bottom 20 and a top perimeter wall 30W arranged to extend along perimeter portions of backrest 34. Top perimeter wall 30W includes an upper left-side wall strip 30WL that is formed to include a first upper belt-receiver slot 31 located on a left side of backrest 34 and cooperates with the lower left-side wall strip 20WL of bottom perimeter wall 20W to establish a first side of juvenile vehicle seat 10 as shown in FIG. 3. Top perimeter wall 30W further includes an upper right-side wall strip 30WR that is formed to include a second upper belt-receiver slot 32 located on an opposite right side of backrest 34 and cooperates with the lower right-side wall strip 20WR of bottom perimeter wall 20W to establish an opposite second side of juvenile vehicle seat 10 as shown in FIG. 4. First and second lower belt-receiver slots 21, 22 cooperate to form bottom-anchor means for receiving a laterally extending section of a lap portion 16L of a vehicle seat belt 16 coupled to the passenger seat 12 associated with seat bottom 20 to anchor seat bottom 20 in a stationary position on the passenger seat 12 in a HARNESS mode of juvenile vehicle seat 10 so that a child-restraint harness 18 associated with seat bottom 20 and seat back 30 and separated from vehicle seat belt 16 is operative to retain the child seated on seat bottom 20 in a restrained position in juvenile vehicle seat 10 without using lap portion 16L of vehicle seat belt 16 to restrain child on seat bottom 20 as shown in FIG. 1.

First and second upper belt-receiver slots 31, 32 cooperate to form back-anchor means for receiving a laterally extending section of a shoulder portion 16S of the vehicle seat belt 16 coupled to the passenger seat 12 associated with seat bottom 20 to anchor seat back 30 in a stationary position on passenger seat 12 in the HARNESS mode of juvenile vehicle seat 10 as shown in FIGS. 1 and 3. This causes the child-restraint harness 18 associated with seat bottom 20 and seat back 30 and separated from the vehicle seat belt 16 to be operative to retain the child seated on seat bottom 20 in a restrained position in juvenile vehicle seat 10 without using the shoulder portion 16S of vehicle seat belt 16 to restrain the child on seat bottom 20 and seat back 30 as shown in FIG. 1.

Seat bottom 20 is formed to include a first rear belt-receiver channel 23 located on a rear left side of seat bottom 20 between the seat back 30 and the first lower belt-receiver slot 21 and a second rear belt-receiver channel 24 located on a rear right side of seat bottom 20 between the seat back 30 and the second lower belt-receiver slot 22 as shown in FIGS. 3 and 4. First and second rear belt-receiver channels 23, 24 cooperate with the first upper belt-receiver slot 31 to form booster means for receiving portions of the juvenile seat belt 16 in an alternative BOOSTER mode of juvenile vehicle seat 10 to cause a laterally extending section of lap portion 16L of vehicle seat belt 16 to pass through the first and second rear belt-receiver channels 23, 24 and across a lower torso of a child seated on seat bottom 20 without passing through the first and second lower belt-receiver slots 21, 22 and to cause a diagonally extending section of the shoulder portion 16S of the vehicle seat belt 16 to pass through the first upper belt-receiver slot 31 and the second rear belt-receiver channel 24 and across the upper torso of the child seated on seat bottom 20 without passing through the second upper belt-receiver slot 32 so that the child seated on seat bottom 20 is restrained by lap and shoulder portions 16L, 16S of the juvenile seat belt 16 without resort to the child-restraint harness 18 associated with seat bottom 20 and seat back 30 in the alternative BOOSTER mode of juvenile vehicle seat 10 as shown in FIG. 2.

Figure 5:
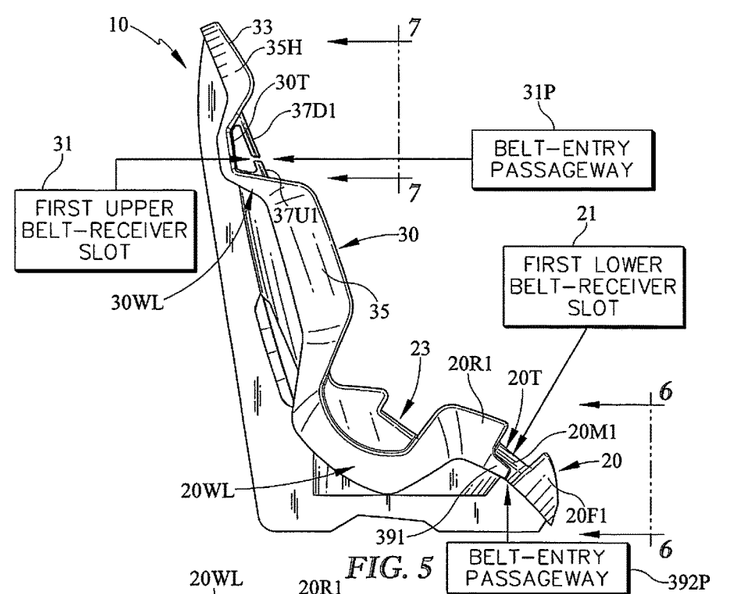
Figure 6:
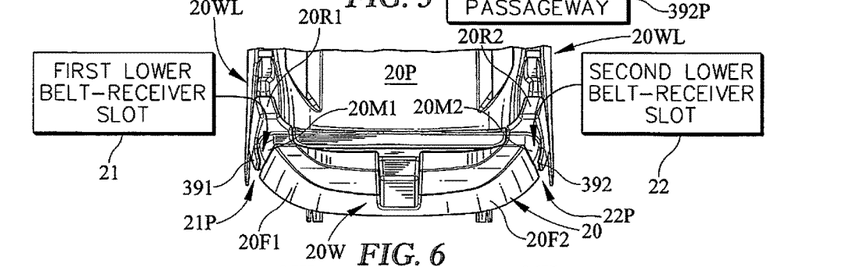
FIG. 6 is a partial front elevation view taken along line 6-6 of FIG. 5 showing (on the left) the forwardly extending belt-retainer post associated with the first lower belt-receiver slot and (on the right) the forwardly extending belt-receiver post associated with the second lower belt-receiver slot.
Figure 7:
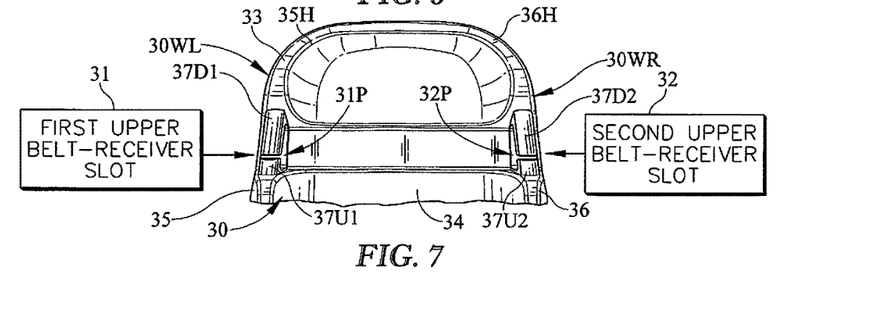
FIG. 7 is a partial front elevation view taken along line 7-7 of FIG. 5 showing the two opposing belt-retainer posts on the left that cooperate to define the belt-entry passageway that opens into the first upper belt-receiver slot and the two opposing belt-retainer posts on the right that cooperate to define the belt-entry passageway that opens into the second upper belt-retainer slot.

Seat pad 20P is formed to include a laterally extending lower trench 20T extending laterally between the first and second lower belt-receiver slots 21, 22 and downwardly below an upwardly facing top surface of the seat pad 20P as shown in FIGS. 3 and 8-10 to provide means in seat pad 20P for retaining the laterally extending section of the lap portion 16L of the vehicle seat belt 16 under legs of a child seated on the upwardly facing top surface of seat pad 20P and held in the restrained position by the child-restraint harness 18 when juvenile vehicle seat 10 is in the HARNESS mode as shown in FIG. 1. Lower left-side strip 20WL of the bottom perimeter wall 20W of seat bottom 20 includes a first front segment 20F1 arranged to lie in spaced-apart relation to backrest 34 and a first rear segment 20R1 arranged to lie between first front segment 20F1 and backrest 34 and in spaced-apart location to the first front segment 20F1 to define the first lower belt-receiver slot 21 therebetween as shown in FIGS. 3 and 5. Lower right-side wall strip of bottom perimeter wall 20W of seat bottom 20 includes a second front segment 20F2 arranged to lie in spaced-apart relation to backrest 34 and a second rear segment 20R2 arranged to lie between the second front segment 20F2 and backrest 34 and in spaced-apart relation to second front segment 20F2 to define the second lower belt-receiver slot 22 therebetween as shown in FIG. 4.

First and second rear belt-receiver channels 23, 24 cooperate to form booster means for receiving the laterally extending section of the lap portion 16L of the vehicle seat belt 16 in the alternative BOOSTER mode of juvenile vehicle seat 10 after the laterally extending section of the lap portion 16L of the vehicle seat belt 16 has been removed from the laterally extending lower trench 30T during a change from HARNESS mode to BOOSTER mode so that the laterally extending section of the lap portion 16L of the vehicle seat belt 16 is arranged to extend laterally across a lap of a child seated on seat bottom 20 to retain the child seated on seat bottom 20 in the restrained position in juvenile vehicle seat 10 in an alternative BOOSTER mode without using the child-restraint harness 18 associated with the HARNESS mode as shown in FIG. 2. In this alternative BOOSTER mode, the diagonally extending section of the shoulder portion 16S of the vehicle seat belt 16 could be arranged to pass through first upper belt-receive slot 31 as shown in FIG. 2 or through second upper belt-receiver slot 32 as shown in FIG. 13 at the option of the caregiver.

Lower left-side wall strip of bottom perimeter wall 20W of seat bottom 20 further includes a first middle segment 20M1 arranged to interconnect the first rear 20R1 segment and the first front segment 20F1 and a forwardly extending first belt-retainer post 391 having a proximal end cantilevered to the first rear segment 20R1 as shown in FIG. 5. First belt-retainer post 391P also includes a free end arranged to lie in close proximity and spaced-apart relation to the first front segment 20F1 to define therebetween a first lower belt-entry passageway 21P into the first lower belt-receiver slot 21 as shown in FIG. 3B to allow movement of the laterally extending section of the lap portion 16L of the vehicle seat belt 16 into and out of the first lower belt-receiver slot 21 during changeover of juvenile vehicle seat 10 between the HARNESS mode and the BOOSTER mode.

Lower right-side wall strip of bottom perimeter wall 20W of seat bottom 20 further includes a second middle segment 20M2 arranged to interconnect the second rear segment 20R2 and the second front segment 20F2 and a forwardly extending second belt-retainer post 392 having a proximal end cantilevered to the second rear segment 20R2 as shown in FIG. 4. Second belt-retainer post 39₂ also includes a free end arranged to lie in close proximity and spaced-apart relation to the second front segment 20F2 to define therebetween a second lower belt-entry passageway 22P opening into the second lower belt-receiver slot 22 as shown in FIG. 4 to allow movement of the laterally extending section of the lap portion 16L of the vehicle seat belt 16 into and out of the second lower belt-receiver slot 22 during changeover of the juvenile vehicle seat 10 between the HARNESS mode and the BOOSTER mode.

Seat back 30 further includes a headrest 33 arranged to extend upwardly from backrest 34 in a direction away from seat bottom 20 as shown in FIGS. 1 and 2. Seat back 30 is formed to include a laterally extending upper trench 30T extending from the first side of backrest 34 to the second side of backrest 34 and lying between headrest 33 and backrest 34 as shown in FIG. 8. Upper trench 30T comprises means for receiving a laterally extending section of the shoulder portion 16S of the vehicle seat belt 16 when juvenile vehicle seat 10 is in the HARNESS mode as shown in FIGS. 1, 3, and 4.

The laterally extending upper trench 30T formed in seat back 30 is arranged to extend laterally between the first and second upper belt-receiver slots 31, 32 and rearwardly away from a forwardly facing front surface of backrest 34 as suggested in FIGS. 3, 4, and 8. Upper trench 30T provides means in backrest 34 for retaining the laterally extending section of the shoulder portion 16S of the vehicle seat belt 16 behind a child seated on an upwardly facing top surface of seat pad 20P and held in the restrained position by the child-restraint harness 18 when juvenile vehicle seat 10 is in the HARNESS mode as shown in FIG. 1.

Top perimeter wall 30T is also arranged to extend along a perimeter portion of headrest 33 as shown in FIGS. 3 and 4. Upper left-side wall strip 30WL of the top perimeter wall of seat back 30 includes a forwardly extending first headrest side-wing panel 35H arranged to lie alongside the left side of headrest 33 and a forwardly extending first backrest side-wing panel 35 arranged to lie alongside the left side of backrest 34 and in vertically spaced-apart relation to the forwardly extending first headrest side-wing panel 35 to define the first upper belt-receiver slot 31 therebetween as suggested in FIGS. 3-5. Upper right-side wall strip 30WR of the top perimeter wall 30W of seat back 30 includes a forwardly extending second headrest side-wing panel 36H arranged to lie alongside the right side of headrest 33 and in laterally spaced-apart relation to the forwardly extending first headrest side-wing panel 35H and a forwardly extending second backrest side-wing panel 36 arranged to lie alongside the right side of backrest 34 in laterally spaced-apart relation to the forwardly extending first backrest side-wing panel 35 and in vertically spaced-apart relation to the forwardly extending second headrest side-wing panel 36H to define the second upper belt-receiver slot 32 therebetween as shown in FIGS. 3 and 4.

Upper left-side wall strip 30WL of the top perimeter wall 30W of seat back 30 further includes a downwardly extending first headrest belt-retainer post 37D1 cantilevered to the forwardly extending first headrest side-wing panel 35H and an aligned companion upwardly extending first backrest belt-retainer post 37U1 cantilevered to the forwardly extending first backrest side-wing panel 35 as shown in FIGS. 3-5. Free ends of the first headrest and backrest belt-retainer posts 37D1, 37U1 cooperate to define therebetween a first upper belt-entry passageway 31P opening into the first upper belt-receiver slot 31 as shown in FIG. 3A to allow movement of the laterally extending section of the shoulder portion 16S of the vehicle seat belt 16 into and out of the first upper belt-receiver slot 31 during changeover of juvenile vehicle seat 10 between the HARNESS mode and the BOOSTER mode. The upwardly extending first backrest retainer post 37U1 has a first length and the downwardly extending headrest-retainer post 37D1 has a relatively longer second length as shown, for example, in FIG. 5.

Upper right-side wall strip 30WR of the top perimeter wall 30W of seat back 30 further includes a downwardly extending second headrest belt-retainer post 37D2 cantilevered to the forwardly extending second headrest side-wing panel 35H and an aligned companion upwardly extending second backrest belt-retainer post 37U2 cantilevered to the forwardly extending second backrest side-wing panel 36 as shown in FIGS. 3 and 4. Free ends of the second headrest and backrest belt-retainer posts 37D2, 37U2 cooperate to define therebetween a second upper belt-entry passageway 32P opening into the second upper belt-receiver slot 34 as shown in FIG. 4 to allow movement of the laterally extending section of the shoulder portion 16S of the vehicle seat belt 16 into and out of the second upper belt-receiver slot 34 during changeover of juvenile vehicle seat 10 between the HARNESS mode and the BOOSTER mode.

The invention claimed is:

1. A juvenile vehicle seat comprising
a seat bottom adapted to set on a passenger seat of a vehicle, the seat bottom including a seat pad adapted to support buttocks of a child seated on the seat bottom and a bottom perimeter wall arranged to extend along a perimeter portion of the seat pad, the seat pad includes a left side, a right side opposite to the left side, and a rear side arranged to extend from the left side to the right side, and the bottom perimeter wall includes a lower left-side wall strip that is formed to include a first lower belt-receiver slot located on the left side of the seat pad and a lower right-side wall strip that is formed to include a second lower belt-receiver slot located on the right side of the seat pad and
a seat back arranged to extend upwardly from the rear side of the seat pad to establish a junction between a rear portion of the seat bottom and a lower portion of the seat back, the seat back including a backrest adapted to support an upper torso of a child seated on the seat bottom and a top perimeter wall arranged to extend along a perimeter portion of the backrest, the top perimeter wall includes an upper left-side wall strip that is formed to include a first upper belt-receiver slot located on a left side of the backrest and cooperates with the lower left-side wall strip of the bottom perimeter wall to establish a first side of the juvenile vehicle seat, and the top perimeter wall further includes an upper right-side wall strip that is formed to include a second upper belt-receiver slot located on an opposite right side of the backrest and cooperates with the lower right-side wall strip of the bottom perimeter wall to establish an opposite second side of the juvenile vehicle seat,
wherein the first and second lower belt-receiver slots cooperate to form bottom-anchor means for receiving a laterally extending section of a lap portion of a vehicle seat belt coupled to the passenger seat associated with the seat bottom in an exposed position facing the legs of a child seated in the seat bottom to anchor the seat bottom in a stationary position on the passenger seat in a harness mode of the juvenile vehicle seat so that a child-restraint harness associated with the seat bottom and seat back and separated from the vehicle seat belt is operative to retain the child seated on the seat bottom in a restrained position in the juvenile vehicle seat without using the lap portion of the vehicle seat belt to restrain the child on the seat bottom.

2. The juvenile vehicle seat of claim 1, wherein the first and second upper belt-receiver slots cooperate to form back-anchor means for receiving a laterally extending section of a shoulder portion of the vehicle seat belt coupled to the passenger seat associated with the seat bottom in an exposed position facing toward the head of a child seated in the seat bottom to anchor the seat back in a stationary position on the passenger seat in the harness mode of the juvenile vehicle seat so that the child-restraint harness associated with the seat bottom and seat back and separated from the vehicle seat belt is operative to retain the child seated on the seat bottom in a restrained position in the juvenile vehicle seat without using the shoulder portion of the vehicle seat belt to restrain the child on the seat bottom and back.

3. A juvenile vehicle seat comprising
a seat bottom adapted to set on a passenger seat of a vehicle, the seat bottom including a seat pad adapted to support buttocks of a child seated on the seat bottom and a bottom perimeter wall arranged to extend along a perimeter portion of the seat pad, the seat pad includes a left side, a right side opposite to the left side, and a rear side arranged to extend from the left side to the right side, and the bottom perimeter wall includes a lower left-side wall strip that is formed to include a first lower belt-receiver slot located on the left side of the seat pad and a lower right-side wall strip that is formed to include a second lower belt-receiver slot located on the right side of the seat pad and
a seat back arranged to extend upwardly from the rear side of the seat pad to establish a junction between a rear portion of the seat bottom and a lower portion of the seat back, the seat back including a backrest adapted to support an upper torso of a child seated on the seat bottom and a top perimeter wall arranged to extend along a perimeter portion of the backrest, the top perimeter wall includes an upper left-side wall strip that is formed to include a first upper belt-receiver slot located on a left side of the backrest and cooperates with the lower left-side wall strip of the bottom perimeter wall to establish a first side of the juvenile vehicle seat, and the top perimeter wall further includes an upper right-side wall strip that is formed to include a second upper belt-receiver slot located on an opposite right side of the backrest and cooperates with the lower right-side wall strip of the bottom perimeter wall to establish an opposite second side of the juvenile vehicle seat,
wherein the first and second lower belt-receiver slots cooperate to form bottom-anchor means for receiving a laterally extending section of a lap portion of a vehicle seat belt coupled to the passenger seat associated with the seat bottom to anchor the seat bottom in a stationary position on the passenger seat in a harness mode of the juvenile vehicle seat so that a child-restraint harness associated with the seat bottom and seat back and separated from the vehicle seat belt is operative to retain the child seated on the seat bottom in a restrained position in the juvenile vehicle seat without using the lap portion of the vehicle seat belt to restrain the child on the seat bottom,
wherein the first and second upper belt-receiver slots cooperate to form back-anchor means for receiving a laterally extending section of a shoulder portion of the vehicle seat belt coupled to the passenger seat associated with the seat bottom to anchor the seat back in a stationary position on the passenger seat in the harness mode of the juvenile vehicle seat so that the child-restraint harness associated with the seat bottom and seat back and separated from the vehicle seat belt is operative to retain the child seated on the seat bottom in a restrained position in the juvenile vehicle seat without using the shoulder portion of the vehicle seat belt to restrain the child on the seat bottom and back
wherein the seat bottom is formed to include a first rear belt-receiver channel located on a rear left side of the seat bottom between the seat back and the first lower belt-receiver slot and a second rear belt-receiver channel located on a rear right side of the seat bottom between the seat back and the second lower belt-receiver slot and the first and second rear belt-receiver channels cooperate with the first upper belt-receiver slot to form booster means for receiving portions of the juvenile seat belt in an alternative booster mode of the juvenile vehicle seat to cause a laterally extending section of the lap portion of the vehicle seat belt to pass through the first and second rear belt-receiver channels and across a lower torso of a child seated on the seat bottom without passing through the first and second lower belt-receiver slots and to cause a diagonally extending section of the shoulder portion of the vehicle seat belt to pass through the first upper belt-receiver slot and the second rear belt-receiver channel and across the upper torso of the child seated on the seat bottom without passing through the second upper belt-receiver slot so that the child seated on the seat bottom is restrained by a lap and shoulder portions of the juvenile seat belt without resort to the child-restraint harness associated with the seat bottom and the seat back in the alternative booster mode of the juvenile vehicle seat.

4. A juvenile vehicle seat comprising
a seat bottom adapted to set on a passenger seat of a vehicle, the seat bottom including a seat pad adapted to support buttocks of a child seated on the seat bottom and a bottom perimeter wall arranged to extend along a perimeter portion of the seat pad, the seat pad includes a left side, a right side opposite to the left side, and a rear side arranged to extend from the left side to the right side, and the bottom perimeter wall includes a lower left-side wall strip that is formed to include a first lower belt-receiver slot located on the left side of the seat pad and a lower right-side wall strip that is formed to include a second lower belt-receiver slot located on the right side of the seat pad and
a seat back arranged to extend upwardly from the rear side of the seat pad to establish a junction between a rear portion of the seat bottom and a lower portion of the seat back, the seat back including a backrest adapted to support an upper torso of a child seated on the seat bottom and a top perimeter wall arranged to extend along a perimeter portion of the backrest, the top perimeter wall includes an upper left-side wall strip that is formed to include a first upper belt-receiver slot located on a left side of the backrest and cooperates with the lower left-side wall strip of the bottom perimeter wall to establish a first side of the juvenile vehicle seat, and the top perimeter wall further includes an upper right-side wall strip that is formed to include a second upper belt-receiver slot located on an opposite right side of the backrest and cooperates with the lower right-side wall strip of the bottom perimeter wall to establish an opposite second side of the juvenile vehicle seat, wherein the first and second lower belt-receiver slots cooperate to form bottom-anchor means for receiving a laterally extending section of a lap portion of a vehicle seat belt coupled to the passenger seat associated with the seat bottom to anchor the seat bottom in a stationary position on the passenger seat in a harness mode of the juvenile vehicle seat so that a child-restraint harness associated with the seat bottom and seat back and separated from the vehicle seat belt is operative to retain the child seated on the seat bottom in a restrained position in the juvenile vehicle seat without using the lap portion of the vehicle seat belt to restrain the child on the seat bottom, wherein the seat pad is formed to include a laterally extending lower trench extending laterally between the first and second lower belt-receiver slots and downwardly below an upwardly facing top surface of the seat pad to provide means in the seat pad for retaining the laterally extending section of the lap portion of the vehicle seat belt under legs of a child seated on the upwardly facing top surface of the seat pad and held in the restrained position by the child-restraint harness when the juvenile vehicle seat is in the harness mode.

5. The juvenile vehicle seat of claim 4, wherein the lower left-side strip of the bottom perimeter wall of the seat bottom includes a first front segment arranged to lie in spaced-apart relation to the backrest and a first rear segment arranged to lie between the first front segment and the backrest and in spaced-apart location to the first front segment to define the first lower belt-receiver slot therebetween and the lower right-side wall strip of the bottom perimeter wall of the seat bottom includes a second front segment arranged to lie in spaced-apart relation to the backrest and a second rear segment arranged to lie between the second front segment and the backrest and in spaced-apart relation to the right second front segment to define the second lower belt-receiver slot therebetween.

6. The juvenile vehicle seat of claim 5, wherein the seat bottom is formed to include a first rear belt-receiver channel located on a rear left side of the seat bottom between the seat back and the first rear segment of the left-side wall strip of the bottom perimeter wall of the seat bottom, the seat bottom is formed to include a second rear belt-receiver channel located on a rear right side of the seat bottom between the seat back and the second rear segment of the lower right-side wall strip of the bottom perimeter wall of the seat bottom, and the first and second rear belt-receiver channels cooperate to form booster means for receiving the laterally extending section of the lap portion of the vehicle seat belt in the alternative booster mode of the juvenile vehicle seat after the laterally extending section of the lap portion of the vehicle seat belt has been removed from the laterally extending lower trench during a change from harness mode to booster mode so that the laterally extending section of the lap portion of the vehicle seat belt is arranged to extend laterally across a lap of a child seated on the seat bottom to retain the child seated on the seat bottom in the restrained position in the juvenile vehicle seat in an alternative booster mode without using the child-restraint harness associated with the harness mode.

7. The juvenile vehicle seat of claim 5, wherein the lower left-side wall strip of the bottom perimeter wall of the seat bottom further includes a first middle segment arranged to interconnect the first rear segment and the first front segment and a forwardly extending first belt-retainer post having a proximal end cantilevered to the first rear segment and a free end arranged to lie in close proximity and spaced-apart relation to the first front segment to define therebetween a first lower belt-entry passageway into the first lower belt-receiver slot to allow movement of the laterally extending section of the lap portion of the vehicle seat belt into and out of the first lower belt-receiver slot during changeover of the juvenile vehicle seat between the harness mode and the booster mode.

8. The juvenile vehicle seat of claim 5, wherein the lower right-side wall strip of the bottom perimeter wall of the seat bottom further includes a second middle segment arranged to interconnect the second rear segment and the second front segment and a forwardly extending second belt-retainer post having a proximal end cantilevered to the second rear segment and a free end arranged to lie in close proximity and spaced-apart relation to the second front segment to define therebetween a second lower belt-entry passageway opening into the second lower belt-receiver slot to allow movement of the laterally extending section of the lap portion of the vehicle seat belt into and out of the second lower belt-receiver slot during changeover of the juvenile vehicle seat between the harness mode and the booster mode.

9. The juvenile vehicle seat of claim 1, wherein the seat back further includes a headrest arranged to extend upwardly from the backrest in a direction away from the seat bottom, the seat back is formed to include a laterally extending upper trench extending from the first side of the backrest to the second side of the backrest and lying between the headrest and the backrest and comprising means for receiving a laterally extending section of the shoulder portion of the vehicle seat belt when the juvenile vehicle seat is in the harness mode.

10. A juvenile vehicle seat comprising a seat bottom adapted to set on a passenger seat of a vehicle, the seat bottom including a seat pad adapted to support buttocks of a child seated on the seat bottom and a bottom perimeter wall arranged to extend along a perimeter portion of the seat pad, the seat pad includes a left side, a right side opposite to the left side, and a rear side arranged to extend from the left side to the right side, and the bottom perimeter wall includes a lower left-side wall strip that is formed to include a first lower belt-receiver slot located on the left side of the seat pad and a lower right-side wall strip that is formed to include a second lower belt-receiver slot located on the right side of the seat pad and a seat back arranged to extend upwardly from the rear side of the seat pad to establish a junction between a rear portion of the seat bottom and a lower portion of the seat back, the seat back including a backrest adapted to support an upper torso of a child seated on the seat bottom and a top perimeter wall arranged to extend along a perimeter portion of the backrest, the top perimeter wall includes an upper left-side wall strip that is formed to include a first upper belt-receiver slot located on a left side of the backrest and cooperates with the lower left-side wall strip of the bottom perimeter wall to establish a first side of the juvenile vehicle seat, and the top perimeter wall further includes an upper right-side wall strip that is formed to include a second upper belt-receiver slot located on an opposite right side of the backrest and cooperates with the lower right-side wall strip of the bottom perimeter wall to establish an opposite second side of the juvenile vehicle seat, wherein the first and second lower belt-receiver slots cooperate to form bottom-anchor means for receiving a laterally extending section of a lap portion of a vehicle seat belt coupled to the passenger seat associated with the seat bottom to anchor the seat bottom in a stationary position on the passenger seat in a harness mode of the juvenile vehicle seat so that a child-restraint harness associated with the seat bottom and seat back and separated from the vehicle seat belt is operative to retain the child seated on the seat bottom in a restrained position in the juvenile vehicle seat without using the lap portion of the vehicle seat belt to restrain the child on the seat bottom, wherein the seat back further includes a headrest arranged to extend upwardly from the backrest in a direction away from the seat bottom, the seat back is formed to include a laterally extending upper trench extending from the first side of the backrest to the second side of the backrest and lying between the headrest and the backrest and comprising means for receiving a laterally extending section of the shoulder portion of the vehicle seat belt when the juvenile vehicle seat is in the harness mode, wherein the seat bottom is formed to include a first rear belt-receiver channel located on a rear left side of the seat bottom between the seat back and the first lower belt-receiver slot and a second rear belt-receiver channel located on a rear right side of the seat bottom between the seat back and the second lower belt-receiver slot and the first and second rear belt-receiver channels cooperate with the first upper belt-receiver slot to form booster means for receiving portions of the juvenile seat belt in an alternative booster mode of the juvenile vehicle seat to cause a laterally extending section of the lap portion of the vehicle seat belt to pass through the first and second rear belt-receiver channels and over a lower torso of a child seated on the seat bottom without passing through the first and second lower belt-receiver slots and to cause a diagonally extending section of the shoulder portion of the vehicle seat belt to pass through the first upper belt-receiver slot and the second rear belt-receiver channel and over the upper torso of the child seated on the seat bottom without passing through the laterally extending upper trench and the second upper belt-receiver slot so that the child seated on the seat bottom is restrained by a lap and shoulder portions of the juvenile seat belt without resort to the child-restraint harness associated with the seat bottom and the seat back in the alternative booster mode of the juvenile vehicle seat.

11. A juvenile vehicle seat comprising a seat bottom adapted to set on a passenger seat of a vehicle, the seat bottom including a seat pad adapted to support buttocks of a child seated on the seat bottom and a bottom perimeter wall arranged to extend along a perimeter portion of the seat pad, the seat pad includes a left side, a right side opposite to the left side, and a rear side arranged to extend from the left side to the right side, and the bottom perimeter wall includes a lower left-side wall strip that is formed to include a first lower belt-receiver slot located on the left side of the seat pad and a lower right-side wall strip that is formed to include a second lower belt-receiver slot located on the right side of the seat pad and a seat back arranged to extend upwardly from the rear side of the seat pad to establish a junction between a rear portion of the seat bottom and a lower portion of the seat back, the seat back including a backrest adapted to support an upper torso of a child seated on the seat bottom and a top perimeter wall arranged to extend along a perimeter portion of the backrest, the top perimeter wall includes an upper left-side wall strip that is formed to include a first upper belt-receiver slot located on a left side of the backrest and cooperates with the lower left-side wall strip of the bottom perimeter wall to establish a first side of the juvenile vehicle seat, and the top perimeter wall further includes an upper right-side wall strip that is formed to include a second upper belt-receiver slot located on an opposite right side of the backrest and cooperates with the lower right-side wall strip of the bottom perimeter wall to establish an opposite second side of the juvenile vehicle seat, wherein the first and second lower belt-receiver slots cooperate to form bottom-anchor means for receiving a laterally extending section of a lap portion of a vehicle seat belt coupled to the passenger seat associated with the seat bottom to anchor the seat bottom in a stationary position on the passenger seat in a harness mode of the juvenile vehicle seat so that a child-restraint harness associated with the seat bottom and seat back and separated from the vehicle seat belt is operative to retain the child seated on the seat bottom in a restrained position in the juvenile vehicle seat without using the lap portion of the vehicle seat belt to restrain the child on the seat bottom, wherein the seat back further includes a headrest arranged to extend upwardly from the backrest in a direction away from the seat bottom, the seat back is formed to include a laterally extending upper trench extending from the first side of the backrest to the second side of the backrest and lying between the headrest and the backrest and comprising means for receiving a laterally extending section of the shoulder portion of the vehicle seat belt when the juvenile vehicle seat is in the harness mode, wherein the laterally extending upper trench is arranged to extend laterally between the first and second upper belt-receiver slots and rearwardly away from a forwardly facing front surface of the backrest to provide means in the backrest for retaining the laterally extending section of the shoulder portion of the vehicle seat belt behind a child seated on an upwardly facing top surface of the seat pad and held in the restrained position by the child-restraint harness when the juvenile vehicle seat is in the harness mode.

12. The juvenile vehicle seat of claim 11, wherein the top perimeter wall is also arranged to extend along a perimeter portion of the headrest, the upper left-side wall strip of the top perimeter wall of the seat back includes a forwardly extending first headrest side-wing panel arranged to lie alongside the headrest and a forwardly extending first backrest side-wing panel arranged to lie alongside the backrest and in vertically spaced-apart relation to the forwardly extending first headrest side-wing panel to define the first upper belt-receiver slot therebetween, and the upper right-side wall strip of the top perimeter wall of the seat back includes a forwardly extending second headrest side-wing panel arranged to lie alongside the headrest and in laterally spaced-apart relation to the forwardly extending first headrest side-wing panel and a forwardly extending second backrest side-wing panel arranged to lie alongside the backrest in laterally spaced-apart relation to the forwardly extending first backrest side-wing panel and in vertically spaced-apart relation to the forwardly extending second headrest side-wing panel to define the second upper belt-receiver slot therebetween.

13. The juvenile vehicle seat of claim 12, wherein the upper left-side wall strip of the top perimeter wall of the seat back further includes a downwardly extending first headrest belt-retainer post cantilevered to the forwardly extending first headrest side-wing panel and an aligned companion upwardly extending first backrest belt-retainer post cantilevered to the forwardly extending first backrest side-wing panel and free ends of the first headrest and backrest belt-retainer posts cooperate to define therebetween a first upper belt-entry passageway opening into the first upper belt-receiver slot to allow movement of the laterally extending section of the shoulder portion of the vehicle seat belt into and out of the first upper belt-receiver slot during changeover of the juvenile vehicle seat between the harness mode and the booster mode.

14. The juvenile vehicle seat of claim 13, wherein the upwardly extending first backrest retainer post has a first length and the downwardly extending headrest-retainer post has a relatively longer second length.

15. The juvenile vehicle seat of claim 12, wherein the upper right-side wall strip of the top perimeter wall of the seat back further includes a downwardly extending second headrest belt-retainer post cantilevered to the forwardly extending second headrest side-wing panel and an aligned companion upwardly extending second backrest belt-retainer post cantilevered to the forwardly extending second backrest side-wing panel and free ends of the second headrest and backrest belt-retainer posts cooperate to define therebetween a second upper belt-entry passageway opening into the second upper belt-receiver slot to allow movement of the laterally extending section of the shoulder portion of the vehicle seat belt into and out of the second upper belt-receiver slot during changeover of the juvenile vehicle seat between the harness mode and the booster mode.

16. The juvenile vehicle seat of claim 11, wherein the top perimeter wall is also arranged to extend along a perimeter portion of the headrest, the upper left-side wall strip of the top perimeter wall of the seat back includes a forwardly extending first headrest side-wing panel alongside the headrest and a forwardly extending first backrest side-wing panel arranged to lie alongside the backrest and in spaced-apart relation to the forwardly extending first headrest side-wing panel to define the first upper belt-receiver slot therebetween, and the upper left-side wall strip of the top perimeter wall of the seat back further includes a downwardly extending first headrest belt-retainer post cantilevered to the forwardly extending first headrest side-wing panel and arranged to extend downwardly toward the forwardly extending first backrest wide-wing panel.

17. The juvenile vehicle seat of claim 11, wherein the top perimeter wall is also arranged to extend along a perimeter portion of the backrest, the upper left-side wall strip of the top perimeter wall of the seat back includes a forwardly extending first backrest side-wing panel alongside the backrest and a forwardly extending first backrest side-wing panel arranged to lie alongside the backrest and in spaced-apart relation to the forwardly extending first backrest side-wing panel to define the first upper belt-receiver slot therebetween, and the upper left-side wall strip of the top perimeter wall of the seat back further includes an upwardly extending first backrest belt-retainer post cantilevered to the forwardly extending first backrest side-wing panel and arranged to extend upwardly toward the forwardly extending first backrest side-wing panel.

\* \* \* \* \*